United States Patent
Chauvel et al.

(10) Patent No.: US 6,412,048 B1
(45) Date of Patent: Jun. 25, 2002

(54) TRAFFIC CONTROLLER USING PRIORITY AND BURST CONTROL FOR REDUCING ACCESS LATENCY

(75) Inventors: Gérard Chauvel, Antibes; Serge Lasserre, Frejus; Dominique Benoît Jacques d'Inverno, Villeneuve Loubet, all of (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/189,080

(22) Filed: Nov. 9, 1998

(30) Foreign Application Priority Data

Apr. 29, 1998 (FR) ............................................. 98 05423

(51) Int. Cl.$^7$ .............................................. G06F 12/00
(52) U.S. Cl. ....................... 711/158; 711/105; 711/106; 714/754; 365/222
(58) Field of Search ........................ 711/105–106, 158; 365/222; 714/754; 710/57

(56) References Cited

U.S. PATENT DOCUMENTS

| 4,059,850 A | * | 11/1977 | Eck et al. .................... 711/136 |
| 4,755,938 A | * | 7/1988 | Takahashi et al. ........... 710/241 |
| 5,706,482 A | * | 1/1998 | Matsushima et al. ........ 345/521 |
| 5,752,266 A | * | 5/1998 | Miyawaki et al. ........... 711/158 |
| 5,805,905 A | * | 9/1998 | Biswas et al. ............... 710/244 |
| 5,809,278 A | * | 9/1998 | Watanabe et al. ............ 711/150 |
| 6,094,696 A | * | 7/2000 | Choe et al. .................... 710/57 |

* cited by examiner

*Primary Examiner*—Do Hyun Yoo
*Assistant Examiner*—Mehdi Namazi
(74) *Attorney, Agent, or Firm*—Ronald O. Neerings; James Wade Brady, III; Frederick J. Telecky, Jr.

(57) ABSTRACT

A memory traffic access controller (18) responsive to a plurality of requests to access a memory. The controller includes circuitry (18d) for associating, for each of the plurality of requests, an initial priority value corresponding to the request. The controller further includes circuitry (18b, 18d, 18e, 18f) for changing the initial priority value for selected ones of the plurality of requests to a different priority value. Lastly, the controller includes circuitry for outputting (18d) a signal to cause access of the memory in response to a request in the plurality of requests having a highest priority value.

13 Claims, 6 Drawing Sheets

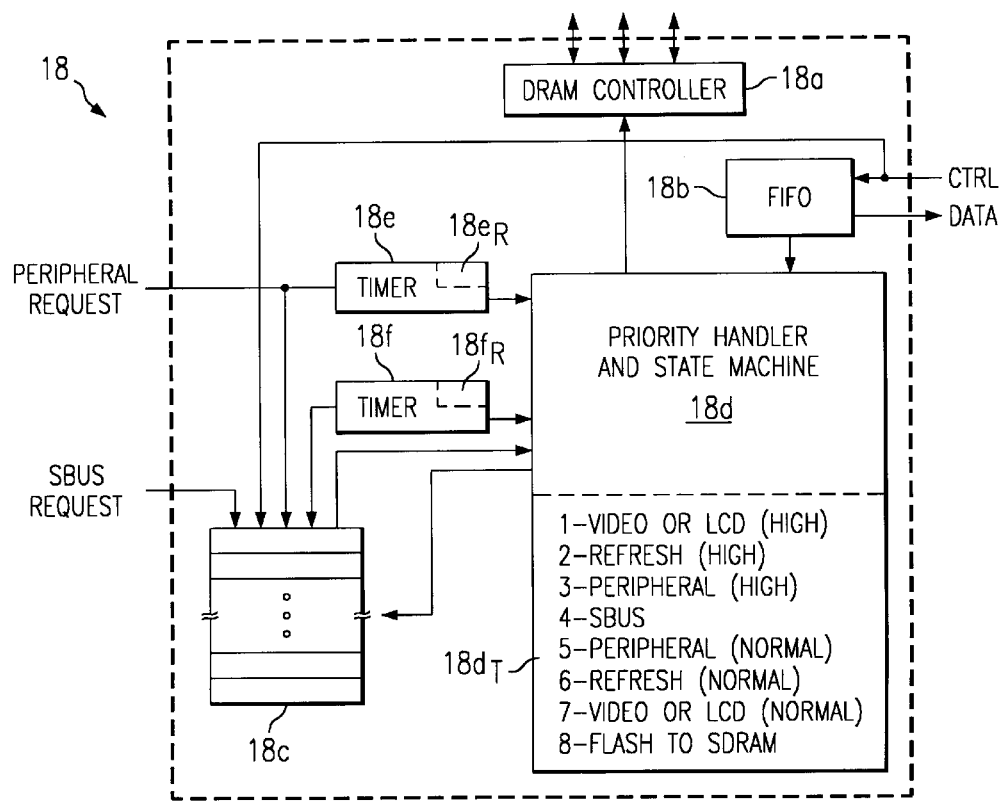
FIG. 8
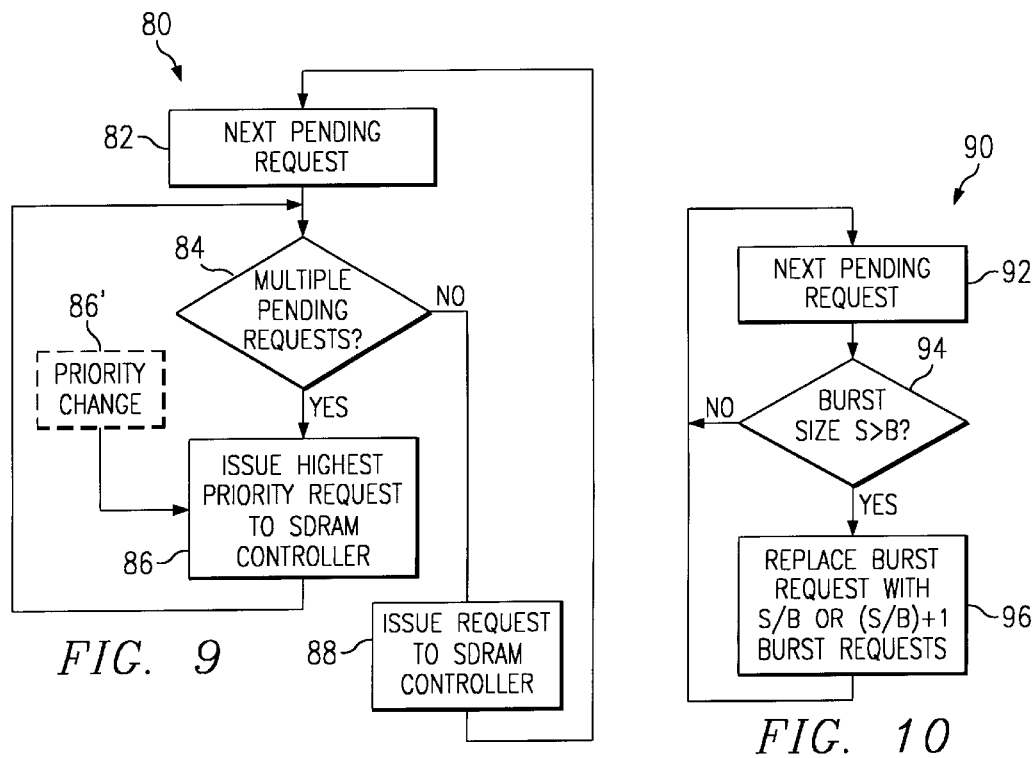
FIG. 9
FIG. 10

TRAFFIC CONTROLLER USING PRIORITY AND BURST CONTROL FOR REDUCING ACCESS LATENCY

CROSS-REFERENCES TO RELATED APPLICATIONS

This application claims a priority right from France Patent Application 98 05423, entitled Contrôleur d'accès de trafuc dabs ybe némoire, système de calcul comprenant ce contrôleur d'accès et procédé de fonctionnement d'un tel contrôleur d'accès, having inventors Gérard Chauvel, Serge Lasserre, Dominique Benoît, Jacques d'Inverno, and filed Apr. 29, 1998.

This application is related to France Patent Application 98 95422, entitled "Memory Control Using Memory State Information For Reducing Access Latency," (attorney docket number TI-27315), having the same inventors as the present application, and filed Apr. 29, 1998.

STATEMENT REGARDING FEDERALLY SPONSORED RESEARCH OR DEVELOPMENT

Not Applicable.

BACKGROUND OF THE INVENTION

The present embodiments relate to environments implementing memory control and direct memory access ("DMA"), and are more particularly directed to circuits, systems, and methods in these environments for reducing access latency.

Memory control is typically accomplished in the computing art by a mechanism referred to as a memory controller, or often as a DRAM controller since dynamic random access memory ("DRAM") is often the type of memory being controlled. A DRAM controller may be a separate circuit or a module included within a larger circuit, and typically receives requests for accessing one or more memory locations in the corresponding memory. To respond to each request, the memory controller implements sufficient circuitry (e.g., address decoders and logic decoders) to provide the appropriate control signals to a memory so that the memory is properly controlled to enable and disable its storage circuits.

While some DRAM controllers are directed to certain efficiencies of memory access, it has been observed in connection with the present inventive embodiments that some limitations arise under current technology. Some of these limitations are caused by DRAM controllers which cause a large number of overhead cycles to occur, where overhead cycles represent those cycles when the DRAM is busy but is not currently receiving or transmitting data. One common approach to reduce the overall penalty caused by overhead is using burst operations. Burst operations reduce overall overhead because typically only a single address is required along with a burst size, after which successive data units (i.e.,. the burst) may be either read or written without additional overhead per each data unit. However, even with burst technology, it is still important to examine the amount of overhead cycles required for a given burst size. In this regard, under current technology the ratio of burst length to total access length provides one measure of efficiency. Given that measure, efficiency can be improved by increasing the burst length, that is, by providing long uninterrupted burst accesses. In other words, efficiency is considered higher because for the same number of overhead cycles there is an increase in the number of data access cycles relative to overhead cycles. However, it has been observed by the present inventors that such an approach also may present drawbacks. As one drawback, a burst of a larger number of cycles prevents access to the memory by a different requesting circuit during the burst; alternatively, if the different requesting circuit is permitted to interrupt the burst, then it typically is achieved by an interrupt which then adds overhead cycles to stop the current burst and then additional overhead to re-start the burst once the access for the different requesting circuit is complete. These drawbacks are particularly pronounced in a system which includes more than one processor (e.g., general purpose, specific processor, MPU, SCP, video controller, or the like) having access to the same DRAM.

To further illustrate the above limitations and thus by way of additional introduction, FIG. 1 illustrates a timing diagram of four accesses to a main memory via a DRAM controller, with those accesses labeled generally A1 through A4. For sake of this example, assume that accesses A1 and A3 are by a first resource R1 (e.g., a CPU), while accesses A2 and A4 are by a second resource R2 (e.g., an external peripheral). Accesses A1 through A4 are examined in further detail below, with it noted at this point that FIG. 1 presents for each an example of the typical numbers of clock cycles expended in those accesses. These numbers as well as the timing of the accesses are later used to illustrate various of the benefits of the present inventive embodiments.

Access A1 represents a read burst access to the main memory where the burst is of eight words of data. The first portion of access A1 is a period of overhead, which in the example of FIG. 1 spans six cycles. This overhead is referred to in this document as leading overhead, and as known in the art includes operations such as presenting control signals including the address to be read to the main memory and awaiting the operation of the main memory in response to those signals. The second portion of access A1 is the presentation of the burst of data from the main memory. In the current example, it is assumed that the burst size is eight and that each burst quantity (e.g., 16 bits) exhausts a single cycle. Thus, the burst of eight 16-bit quantities spans a total of eight cycles. Concluding the discussion of access A1, one skilled in the art will therefore appreciate that it spans a total of 14 cycles.

Accesses A2, A3, and A4 represent a single data read, a write burst, and a single data write, respectively. Like access A1, each of accesses A2, A3, and A4 commences with some number of leading overhead cycles. Specifically, the read operation of access A2 uses six cycles of leading overhead, while each of the write operations of accesses A3 and A4 uses three cycles of leading overhead. Additionally, each of accesses A2, A3, and A4 is shown to expend a single cycle per data quantity. Thus, the single data operations of accesses A2 and A4 each consume a corresponding single cycle, while the burst operation of access A3 consumes eight cycles, with each of those eight cycles corresponding to one of the eight bursts of write data. Lastly, note that each of accesses A2, A3, and A4 also includes overhead after the data access, where this overhead is referred to in this document as ending overhead. Such overhead also may arise from various control operations, such as precharging memory rows and/or banks as well as receipt of a signal indicating the end of an access. In the present example of FIG. 1, the read operation of access A2 uses two cycles of ending overhead, the write operation of access A3 uses four cycles of ending overhead, and the write operation of access A4 uses five cycles of ending overhead.

Concluding with some observations regarding the illustration of FIG.1 it is now instructive to examine various of its drawbacks. As a first drawback, note that a total of 47 cycles are expended for accessing only 18 data quantities. Therefore, 29 cycles arise from overhead operations and, thus, 62 percent of the cycles (i.e., 29/47=0.62) relate to overhead leaving only 38 percent of the cycles (i.e., 18/47= 0.38) for actual data access. As another consideration to the FIG. 1 approach, note that a gap between accesses A3 and A4 occurs, which for example may arise when there is a sufficient gap between the requests giving rise to accesses A3 and A4. When such a gap arises, there are yet additional latency clock cycles expended as mere wait time, shown as 8 cycles by way of example in FIG. 1. During that time, there is no use of the bandwidth for access to data. In addition, after the wait time, there is additional latency at the beginning of access A4 when the DRAM controller once again submits the leading overhead for access A4. Given the above, one skilled in the art will appreciate that these factors as well as others contribute to and increase the average time for accessing data (i.e., latency) and degrade overall system performance.

By way of further background, some system latency has been addressed in the art by using DMA. DMA enables peripherals or coprocessors to access memory without heavy usage of resources of processors to perform the data transfer. A traffic controller groups and sequences DMA accesses as well as direct processor accesses. More particularly, other peripherals may submit requests for access to the traffic controller and, provided a request is granted by the controller, are given access to the main memory via a DMA channel. Additionally, the CPU also may have access to the main memory via a channel provided via the traffic controller and separate from DMA. In any case, the DMA approach typically provides an access channel to memory so that multiple devices may have access to the memory via DMA.

While DMA has therefore provided improved performance in various contexts, the present inventors have also recognized that it does not address the drawbacks of the memory controller described in connection with FIG. 1. In addition, the present inventive scope includes considerations of priority which may be used in connection with DMA and traffic control, and which improve system performance both alone and further in combination with an improved memory controller.

In view of the above, there arises a need to address the drawbacks of the prior art and provide improved memory control and access traffic control for reducing memory access latency.

BRIEF SUMMARY OF THE INVENTION

In one embodiment there is a memory traffic access controller responsive to a plurality of requests to access a memory. The controller includes circuitry for associating, for each of the plurality of requests, an initial priority value corresponding to the request. The controller further includes circuitry for changing the initial priority value for selected ones of the plurality of requests to a different priority value. Lastly, the controller includes circuitry for outputting a signal to cause access of the memory in response to a request in the plurality of requests having a highest priority value. Other circuits, systems, and methods are also disclosed and claimed.

BRIEF DESCRIPTION OF THE SEVERAL VIEWS OF THE DRAWING

FIG. 8 illustrates a block diagram depicting greater detail for traffic controller 18 of FIG. 2 in connection with various priority aspects;

FIG. 9 illustrates a flow chart of an embodiment of processing memory access requests by traffic controller 18 to reduce system latency using various priority considerations; and FIG. 10 illustrates a flow chart of an embodiment of processing memory access requests by traffic controller 18 to reduce system latency by dividing relatively large burst access requests into two or more smaller burst access requests.

DETAILED DESCRIPTION OF THE INVENTION

Figure 2:
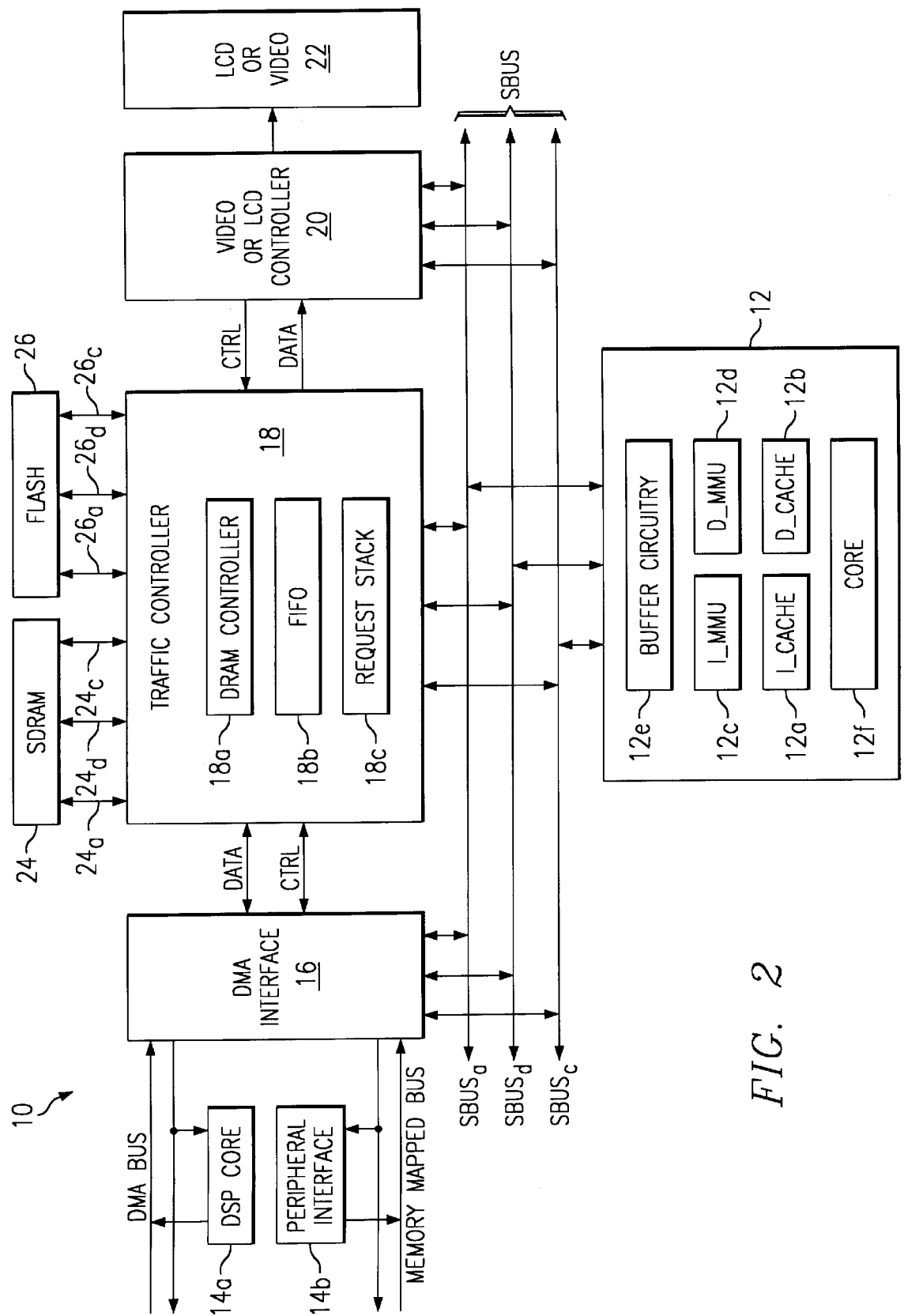
FIG. 2 illustrates a block diagram of a wireless data platform in which the present embodiments may be implemented.

FIG. 2 illustrates a preferred embodiment of a general wireless data platform 10 into which various of the DRAM control and traffic control embodiments described in this document may be implemented, and which could be used for example in the implementation of a Smartphone or a portable computing device. Wireless data platform 10 includes a general purpose (Host) processor 12 having an instruction cache 12a and a data cache 12b, each with a corresponding instruction memory management unit ("MMU") 12c and 12d, and further illustrates buffer circuitry 12e and an operating core 12f, all of which communicate with a system bus SBUS. The SBUS includes data $SBUS_d$, address $SBUS_a$, and control $SBUS_c$ conductors. A digital signal processor ("DSP") 14a having its own internal cache (not shown), and a peripheral interface 14b, are coupled to the SBUS. Although not shown, various peripheral devices may therefore be coupled to peripheral interface 14b, including a digital to analog converter ("DAC") or a network interface. DSP 14a and peripheral interface 14b are coupled to a DMA interface 16 which is further coupled to a traffic controller 18 detailed extensively below. Traffic controller 18 is also coupled to the SBUS as well as to a video or LCD controller 20 which communicates with an LCD or video display 22. Traffic controller 18 is coupled via address $24_a$, data $24_d$, and control $24_c$ buses to a main memory which in the preferred embodiment is a synchronous dynamic random access memory ("SDRAM") 24. Indeed, for purposes of later discussion, note that traffic controller 18 includes a DRAM controller 18a as an interface for the connection between traffic controller 18 and SDRAM 24. Also in this regard, in the present embodiment DRAM controller 18a is a module within the circuit which forms traffic controller 18, but note that various of the circuits and functionality described in this document as pertaining to DRAM controller 18a could be constructed in a separate device and, indeed, may be used in various other contexts. Returning to traffic controller 18 in general, note lastly that it is coupled via address 26a, data 26d, and control 26c buses to a flash memory 26 (or memories).

The general operational aspects of wireless data platform 10 are appreciated by noting that it utilizes both a general purpose processor 12 and a DSP 14a. Unlike current devices in which a DSP is dedicated to specific fixed functions, DSP 14a of the preferred embodiment can be used for any number of functions. This allows the user to derive the full benefit of DSP 14a. For example, one area in which DSP 14a can be used is in connection with functions like speech recognition, image and video compression and decompression, data encryption, text-to-speech conversion, and so on. The present architecture allows new functions and enhancements to be easily added to wireless data platform 10.

Turning the focus now to traffic controller 18, its general operation along with various circuits coupled to it enable it to receive DMA access requests and direct access requests from host 10 processor 12, and in response to both of those requests to permit transfers from/to the following:

host processor 12 from/to SDRAM 24 host processor 12 from/to flash memory 26 flash memory 26 to SDRAM 24 a peripheral coupled to peripheral interface 14b from/to SDRAM 24

SDRAM 24 to video or LCD controller 20

Additionally, in the preferred embodiment, accesses that do not generate conflicts can occur simultaneously. For example, host processor 12 may perform a read from flash memory 26 at the same time as a DMA transfer from SDRAM 24 to video or LCD controller 20. As another aspect, since traffic controller 18 is operable to permit DMA transfers from SDRAM 24 to video or LCD controller 20, note that it includes circuitry, which in the preferred embodiment consists of a first-in-first-out ("FIFO") 18b, to take bursts of data from SDRAM 24 and provide it in continuous flow as is required of pixel data to be provided to video or LCD controller 20.

For purposes of illustration, traffic controller 18 is shown to include a request stack 18c to logically represent that different circuits may request DMA transfers during an overlapping period of time and, thus, these different requested DMA transfers may be pending during a common time period. Note in the preferred embodiment that there is actually no separate physical storage device as request stack 18c, but instead the different requests arrive on one or more conductors. For example, a request from a peripheral device may arrive on a conductor reserved for such a request. In a more complex approach, however, request stack 18c may represent an actual physical storage device. Also in the context of receiving access requests, in the preferred embodiment only one request per requesting source may be pending at traffic controller 18 at a time (other than for auto refresh requests detailed later). This limitation is assured by requiring that any requesting source must receive a grant from DMA controller 18 before issuing an access request; for example, the grant may indicate that the previous request issued by the same source has been serviced. In a more complex embodiment, however, it is contemplated that multiple requests from the same source may be pending in DMA controller 18. Returning to stack 18c, it is intended to demonstrate in any event that numerous requests, either from the same or different sources, may be pending at the same time; these requests are analyzed and processed as detailed below. Further in this regard, traffic controller 18 includes a priority handler detailed later so that each of these pending requests may be selected in an order defined by various priority considerations. In other words, in one embodiment pending requests are served in the order in which they are received whereas, in an alternative embodiment, pending requests are granted access in an order differing than that in which they are received as appreciated later. Lastly, traffic controller 18 includes circuits to support the connections to the various circuits described above which are provided direct or DMA access. For example, traffic controller 18 preferably includes a flash memory interface which generates the appropriate signals required by flash devices. As another example, traffic controller 18 includes DRAM controller 18a introduced above, and which implements the control of a state machine and generates the appropriate signals required by SDRAM 24. This latter interface, as well as various functionality associated with it, is detailed below as it gives rise to various aspects within the present inventive scope.

Having introduced traffic controller 18, note that various inventive methodologies may be included in the preferred embodiment as detailed below. For the sake of presenting an orderly discussion, these methodologies are divided into those pertaining to DRAM controller 18a which are discussed first, and those pertaining to certain priority considerations handled within traffic controller 18 but outside of DRAM controller 18a and which are discussed second. Lastly, however, it is demonstrated that these methodologies may be combined to further reduce latencies which may otherwise occur in the prior art.

In the preferred embodiment, DRAM controller 18a is specified to support three different memories. By way of example, two of these memories are the 16 Mbit TMS626162 (512K×16 bit I/O×2 banks) and the 64 Mbit TMS664164 (1M×16 bit I/O×4 banks), each of which is commercially available from Texas Instruments Incorporated. A third of these memories is a 64 Mbit memory organized in 2 banks. The burst length from SDRAM 24 in response to a request from DRAM controller 18a is fully programmable from one to eight 16-bit data quantities, and as detailed later also can be extended up to 256 (page length) via the traffic controller by sending a first request designated REQ followed by one or more successive requests designated SREQ, thereby permitting all possible burst lengths between 1 and 256 without additional overhead. In the preferred embodiment, this programmability is achieved via control from DRAM controller 18a to SDRAM 24 and not with the burst size of the SDRAM memory control register.

Figure 3:
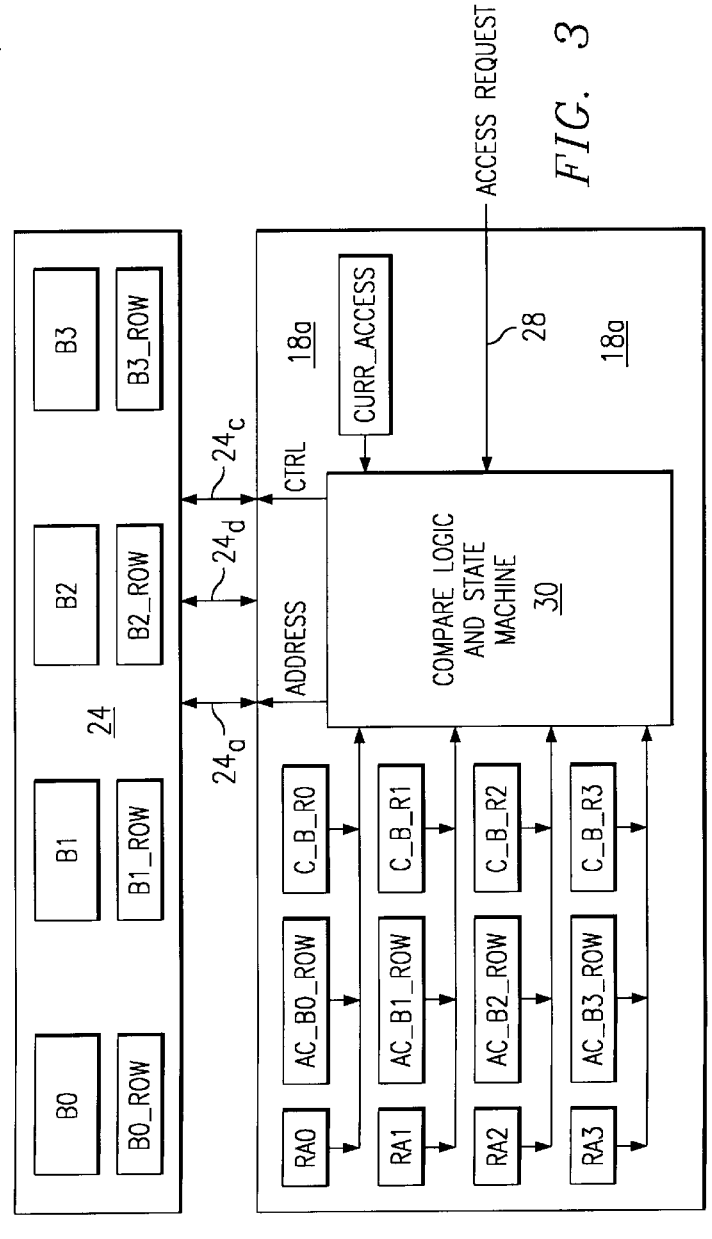
FIG. 3 illustrates a block diagram depicting greater detail for SDRAM 24 and DRAM controller 18d of FIG. 2.

One attractive aspect which is implemented in the preferred embodiment of DRAM controller 18a achieves latency reduction by responding to incoming memory access requests based on an analysis of state information of SDRAM 24. This functionality is shown by way of a flow chart in FIG. 4 and described later, but is introduced here by first turning to the hardware block diagram of FIG. 3. FIG. 3 illustrates both SDRAM 24 and DRAM controller 18a in greater detail than FIG. 2, but again with only selected items shown to simplify the illustration and focus the discussion on certain DRAM control aspects.

Turning to SDRAM 24 in FIG. 3, it includes multiple memory banks indicated as banks B0 through B3. The number of banks, which here is four banks, arises in the example where SDRAM 24 is the Texas Instruments 64 Mbit memory introduced earlier. If a different memory is used, then the number of banks also may differ (e.g., two banks if the 16 Mbit memory introduced earlier is used). As known in the SDRAM art, each bank in a multiple bank memory has a corresponding row register which indicates the row address which is currently active in the corresponding bank. In FIG. 3, these row registers are labeled B0_ROW through B3_ROW corresponding to banks B0 through B3, respectively.

Looking now to DRAM controller 18a in FIG. 3, in the preferred embodiment it includes circuitry sufficient to indicate various state information which identifies the current operation of SDRAM 24, where it is described later how this information is used to reduce latency. Preferably, this state information includes a copy of the same information stored in row registers B0_ROW through B3_ROW. Thus, DRAM controller 18a includes four registers labeled AC_B0_ROW through AC_B3_ROW, where each indicates the active row address (if any) for corresponding banks B0 through B3. Stated alternatively, the information in registers AC_B0_ROW through AC_B3_ROW of DRAM controller 18a mirrors the same information as row registers B0_ROW through B3_ROW of SDRAM 24. In addition, for each of registers AC_B0_ROW through AC_B3_ROW, DRAM controller 18a includes a corresponding bit register C_B_R0 through C_B_R3 which indicates whether the corresponding row is currently accessed. For example, if bit register C_B_R0 is set (e.g., at a value equal to one), then it indicates that the row identified by the address in AC_B0_ROW is currently accessed, whereas if that bit is cleared then it indicates that the row identified by the address in AC_B0_ROW, if any, is not currently accessed. Also for each of registers AC_B0_ROW through AC_B3_ROW, DRAM controller 18a includes a corresponding bit register RAn which indicates that the contents of AC_Bn_ROW is valid and that SDRAM 24 has this row active in the corresponding bank n. Note also that each register RAn (i.e., RA0 through RA3) can be set to 1 at the same time. This means that each bank has a row active whose value is contained in the respective AC_Bn_ROW register. To the contrary, however, only one C_B_Rn may be set to 1 at a time, since it indicates which bank is currently accessed and only one bank can be accessed at a time.

DRAM controller 18a also includes additional circuitry to generate various commands to SDRAM 24 discussed below. In this regard, DRAM controller 18a preferably includes a CURR_ACCESS register which stores information relating to the most recent (or current) request which has been given access to SDRAM 24. This information includes the remaining part of the address of the current access (i.e., the column address), its direction, and size. In addition, DRAM controller 18a includes an input 28 for receiving a next (i.e., pending) access request. The access request information received at input 28 is presented to a compare logic and state machine 30, which also has access to the state information stored in bit registers RA0 through RA3 and C_B_R0 through C_B_R3, the row addresses in registers AC_B0_ROW through AC_B3_ROW, and the information stored in the CURR_ACCESS register. The circuitry used to implement compare logic and state machine 30 may be selected by one skilled in the art from various alternatives, and in any case to achieve the functionality detailed below in connection with FIG. 4. Before reaching that discussion and by way of introduction, note further that compare logic and state machine 30 is connected to provide an address to address bus $24_a$ between DRAM controller 18a and SDRAM 24, and to provide control signals to control bus $24_c$ between DRAM controller 18a and SDRAM 24. As to the latter, note for discussion purposes that the control signals may be combined in various manners and identified as various commands, each of which may be issued per a single cycle, and which are used to achieve the various types of desired accesses (i.e., single read, burst read, single write, burst write, auto refresh, power down). The actual control signals which are communicated to perform these commands include the following signals RAS, CAS, DQML, DQMU, W, CKE, CS, CLK, and the address signals. However, the combinations of these control signals to achieve the functionality set forth immediately below in Table 1 are more easily referred to by way of the command corresponding to each function rather than detailing the values for each of the various control signals.

TABLE 1

| Command | Description |
|---|---|
| ACTV_x | activates bank x (i.e., x represents a particular bank number and includes a row address) |
| DEAC_x | precharges bank x (i.e., x represents a particular bank number) |
| DCAB | precharge all banks at once |
| READ | commences a read of an active row (includes the bank number and a column address) |
| REFR | auto refresh |
| WRITE | commences a write of an active row (includes the bank number and a column address) |
| STOP | terminates a current access; for example, for a single read, STOP is sent on the following cycle after the READ command, whereas for a burst read of eight, STOP is sent on the same cycle as delivery of the eighth data unit. Note also that an access may be stopped either by a STOP command or by another READ or WRITE command. |

Figure 4:
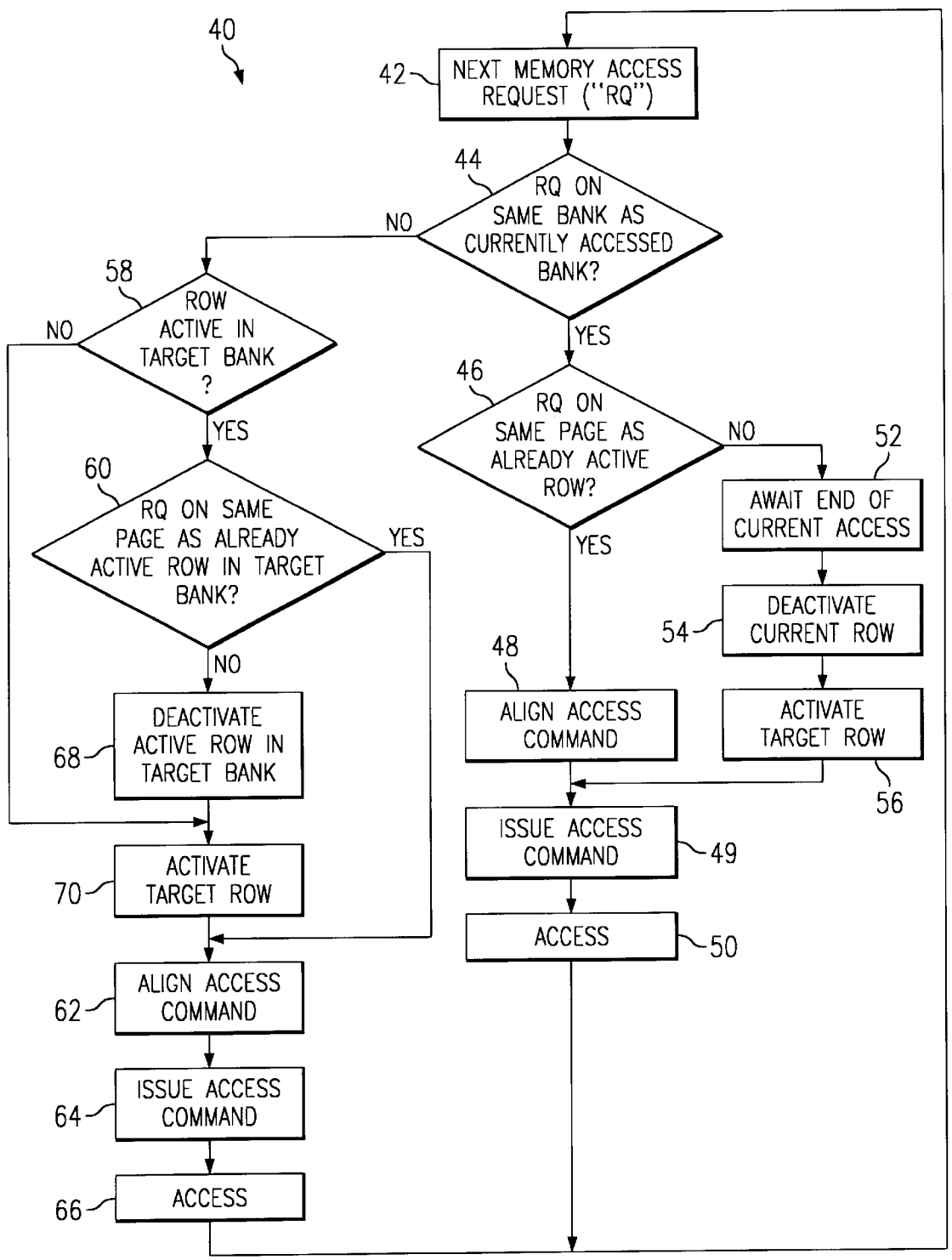
FIG. 4 illustrates a flow chart of an embodiment of processing memory access requests by DRAM controller 18d to reduce system latency.

FIG. 4 illustrates a flow chart of a method designated generally at 40 and which describes the preferred operation of DRAM controller 18a with respect to memory accesses of SDRAM 24, where such method is accomplished through the operation generally of compare logic and state machine 30. Method 40 commences with a step 42 where the next memory access request (abbreviated "RQ") is selected for analysis. In the embodiment of FIG. 3, the RQ is received from input 28. However, as an alternative note that the request may be directly from a bus or the like. Additionally, for sake of simplicity, the present discussion of method 40 illustrates the operation once earlier RQs already have been processed and resulting accesses have been made to each of banks B0 through B3 of SDRAM 24; thus, it is assumed that each of registers AC_B0_ROW through AC_B3_ROW have been loaded with corresponding row addresses, and the remaining bit registers have been placed in the appropriate state based on which rows and/or banks are active. As another assumption, it is assumed that an earlier grant has resulted in a current memory access, that is, there is currently information being communicated along data bus $24_d$ (either a write to, or a read from, SDRAM 24). Given these assumptions, method 40 continues from step 42 to step 44. Before continuing with step 44, however, it should be noted that the following descriptions will further provide to one skilled in the art an understanding of the preferred embodiment even if the preceding assumed events (i.e., already-active rows) have not occurred.

Step 44 determines whether the bank to be accessed by the RQ from step 42 (hereafter referred to as the target bank) is on the same bank as is currently being accessed. Compare logic and state machine 30 makes this determination by comparing the bank portion of the address in the RQ with the bank portion of the address stored in the CURR_ACCESS register. If the target bank of the RQ is on the same bank as is currently being accessed, then method 40 continues from step 44 to 46 as described immediately below. On the other hand, if the target bank of the RQ is on a different bank as is currently being accessed, then method 40 continues from step 44 to 58, and which is detailed later in order to provide a more straightforward discussion of the benefits following step 46.

Step 46 determines, with it now found that the target bank of the RQ is on the same bank as the bank currently being accessed, whether the page to be accessed by the RQ (hereafter referred to as the target page) is on the same row as is already active in the target bank. In this regard, note that the terms "page" and "row" may be considered as referring to the same thing, since in the case of DRAMs or SDRAMs a row in those memories corresponds to a page of information. Thus, step 46 determines whether the target page (or row) is on the same page (or row) as is already active in the target bank. Compare logic and state machine 30 makes this determination by comparing the page address portion of the address in the RQ with the corresponding bits in the active row address stored in the appropriate register for the target bank. For example, if bank B0 is the target bank, then step 46 compares the page address of the RQ with the corresponding bits in the active row value stored in register AC_B0_ROW. If the target page is on the same row as is already active in the target bank, then method 40 continues from step 46 to step 48. Conversely, if the target page is on a different row than the row already active in the target bank, then method 40 continues from step 46 to step 52.

Figure 5:
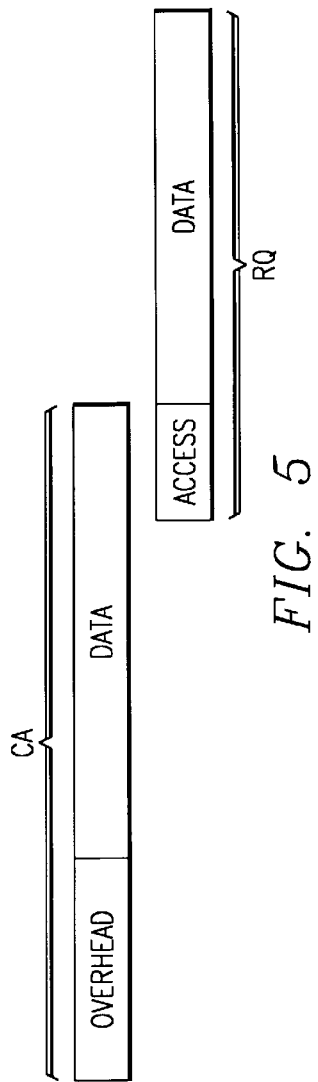
FIG. 5 illustrates a timing diagram of access signals issues according to the method of the flow chart of FIG. 4.

Given the above, note now that step 48 is reached when both the target bank of the RQ is the same as the bank currently being accessed, and the target page is along the row currently active in the target bank. As a result, and providing a considerable improvement in latency illustrated below, step 48 aligns the access command (e.g., READ or WRITE) for the RQ to occur during or near the final data transfer cycle of the current access. To further illustrate this point, FIG. 5 illustrates a timing diagram of both the current access CA and the operation of step 48 with respect to the access arising from the RQ (e.g., a read). Specifically, assume by way of example that the current access CA is producing a burst of eight data units over corresponding eight cycles. Given this example, step 48 aligns the access command to occur during or near the end of the current access CA. In the preferred embodiment, the specific alignment of step 48 is based on whether the RQ is a write or a read. Thus, each of these situations is discussed separately below.

For step 48 aligning an access command when the RQ is a write, the write access command is aligned to be issued in the clock cycle following the last data access of the current access CA. In other words, for an RQ which is a write, if the last data access of the current access CA occurs in cycle N, then the write access command for the RQ is aligned to be issued in cycle N+1. Note further that during the same cycle that the write command is issued on a control bus, the data to be written is placed on a data bus. Thus, the data to be written will be on the data bus also in cycle N+1 and thereby follow immediately the last data from the current access CA which was on the data bus in cycle N.

For step 48 aligning an access command when the RQ is a read, the read access command is aligned to be issued on the first cycle following the last data cycle of the current access CA, minus the CAS latency for the read. Specifically, in most systems, it is contemplated that the CAS latency may be 1, 2, 3, or 4 cycles depending on the memory being accessed and clock frequency. Thus, to align the access command for a read RQ in the preferred embodiment, the number of CAS latency cycles are subtracted from the first cycle following the last data cycle of the current access CA. Indeed, in the preferred embodiment, compare logic and state machine 30 includes an indicator of the current bus frequency, and from that frequency a corresponding CAS latency is selected. Generally, the lower the bus frequency, the lower the CAS latency. For example, in an idle mode where the desired MIPS are low, the bus frequency is relatively low and the CAS latency is determined to be equal to 1. Continuing step 48 for an example of a read RQ and where the CAS latency equals 1 cycle, then step 48 aligns the read access command to occur 1 cycle before the first cycle following the last data cycle of the current access CA. In other words, for an RQ which is a read, if the last data access of the current access CA occurs in cycle N, then the read access command for the RQ is aligned, when the CAS latency equals 1, to be issued in cycle N. By this alignment, therefore, the read access command is issued during the last data cycle of the current access CA, and thus the data which is read in response to this command will appear on the data bus during cycle N+1. For other examples having one or more each additional cycles of CAS latency, the read access is correspondingly aligned by one or more additional cycles before the last data cycle of the current access CA.

Once the access command for the RQ is aligned by step 48, step 49 represents the issuance of this command by DRAM controller 18a to SDRAM 24 in order to service the RQ. The additional benefit of this operation is next appreciated as method 48 continues to step 50, as discussed immediately below.

Step 50, when reached following steps 48 and 49, performs the access in response to the access command aligned by step 48. Thus, continuing the example of FIG. 5, step 50 performs the read which thereby causes the first data unit of an eight data unit burst to be read, and which is then followed until the burst access is complete. Completing the current example, the remaining seven data units are read during seven consecutive clock cycles. Given the preceding, note numerous benefits of the described operation. First, note that the step 48 alignment allows this first data unit of access RQ to be read in the clock cycle immediately following the last data cycle of access CA. Second, note that the operation of steps 48 and 50 is such that the active row is maintained active and for both the first and all consecutive accesses directed to the same row on the same memory bank. In other words, there is no additional step of precharging the row between the occurrence of these accesses. Moreover, in implementing this aspect, the preferred embodiment does not require the address for the RQ to be re-sent to SDRAM 24 for the successive access because the full address is already contained in DRAM controller 18a by concatenating the contents of a row register (i.e., AC_Bn_ROW) with the column address in the CURR_ACCESS register. Again, therefore, the preferred embodiment simply leaves the previously active row active and then performs the access. This aspect of leaving a row active also arises in the context of DMA burst control as detailed later, but note at this point by way of introduction that DRAM controller 18a may receive a request designated SREQ, where such a request indicates that the request is for data that follows in sequence after data which was just requested, and thus may well be directed to the same row address as the immediately preceding request. In any event, there is a reduction in latency which otherwise occurs in the prior art where a row is accessed, then precharged, then re-addressed and re-activated for a subsequent access. Third, note that FIG. 4 illustrates that the flow of method 40 continues from step 50 back to step 42, and it should be understood that this may occur while the access of step 50 is occurring. Consequently, while the access of the present RQ is occurring, step 42 may begin processing the next RQ. In this regard, therefore, one skilled in the art should appreciate that if multiple burst requests are directed to the same bank and the same page in that bank, then method 40 repeatedly aligns the access command and performs data access in the same manner as shown in FIG. 5, thereby repeating for each consecutive instance the latency reduction described immediately above. Thus, this reduction aggregates for each consecutive access and therefore may produce far less latency over consecutive accesses as compared to the prior art.

Returning to step 46 in FIG. 4, the discussion now turns to the instance where method 40 continues from step 46 to step 52 which recall occurs when the target bank matches the currently accessed bank, but the target page is on a different row than the row already active in the target bank. In step 52, method 40 awaits the completion of the current access. In the preferred embodiment, this completion is detected by DRAM controller 1 8a examining the state of an access signal which indicates either "access on" or "no access on." More particularly, when there is a change from access on to no access on it is known to DRAM controller 18a that the current access is complete, thereby ending step 52. Next, step 54 precharges the row which was accessed by the access which is now complete, and this is achieved by DRAM controller 18a transmitting a DEAC_x command to SDRAM 24. Thereafter, step 56 activates the row which includes the target page by sending an ACTV_x command, and once again the method continues to step 49 so that an access command (e.g., through either a READ or WRITE) may be issued and the row may be accessed in step 50. Lastly, note that the deactivation and subsequent activation of steps 54 and 56 is the worst case scenario in terms of cycle usage under the preferred embodiment; however, the probability of this scenario is relatively small considering the properties of locality and spatiality of most systems.

Returning to step 44, the discussion now turns to the instance where method 40 continues from step 44 to step 58 which recall occurs when the target bank is different than the currently accessed bank. Before proceeding, note here that when step 58 is reached, the currently active row on the currently accessed bank (i.e., as evaluated from step 44) is not disturbed from this flow of method 40. In other words, this alternative flow does not deactivate the row of the currently accessed bank and, therefore, it may well be accessed again by a later access where that row is not deactivated between consecutive accesses. Returning now to step 58, it determines whether there is a row active in the target bank. If so, method 40 continues from step 58 to step 60. If there is no active row in the target bank, then method 40 continues from step 58 to step 70. The operation of step 58 is preferably achieved by compare logic and state machine 30 first examining the bit register corresponding to the target bank and which indicates its current status. For example, if bank B1 is the target bank, then compare logic and state machine 30 evaluates whether bit register RA1 is set to indicate an active state. In this regard, note once again that latency is reduced as compared to a system which waits until the current access is complete before beginning any overhead operations toward activating the bank for the next access. Next, method 40 continues from step 58 to step 60.

Step 60 operates in much the same manner as step 46 described above, with the difference being that in step 60 the target bank is different than the bank being currently accessed. Thus, step 60 determines whether the target page is on the same row as in the target bank. If the target page is on the same row as in the target bank, method 40 continues from step 60 to step 62. If the target page is on a different row than the active row in the target bank, method 40 continues from step 60 to step 68. The alternative paths beginning with steps 62 and 68 are described below.

Step 62 aligns the access command for the RQ and then awaits the end of the current access. This alignment should be appreciated with reference also to step 64 which follows step 62. Specifically, in step 62 compare logic and state machine 30 aligns an access command (e.g., either a READ or WRITE command) for issuance to SDRAM 24 which will cause the target bank to be the currently accessed bank. Additionally, note that this operation of step 62 is generally in the same manner as described above with respect to step 48; thus, the reader is referred to the earlier discussion of step 48 for additional detail and which demonstrates that step 62 preferably aligns the access command before or during the last data cycle of the current access. Thus, the method continues to step 64 which issues the READ or WRITE command to SDRAM 24, followed by step 66 when the access corresponding to the RQ is performed. Thereafter, method 40 returns from step 66 to step 42 to process the next memory access request.

Returning to step 60, recall that the flow is directed to step 68 when the RQ is on a different page as is already active in the target bank. In this instance, step 68 precharges the current active row in the target bank. Again, in the preferred embodiment, this is achieved by issuing the DEAC_x command to SDRAM 24. Thereafter, step 70 activates the row which includes the target page, and the method then continues to step 62. From the earlier discussion of step 62, one skilled in the art will therefore appreciate that step 62 then aligns the access command for the RQ, followed by steps 64 and 66 which issue the access command and perform the access corresponding to the RQ. Thereafter, once again method 40 returns from step 66 to step 42 to process the next memory access request.

Figure 1:
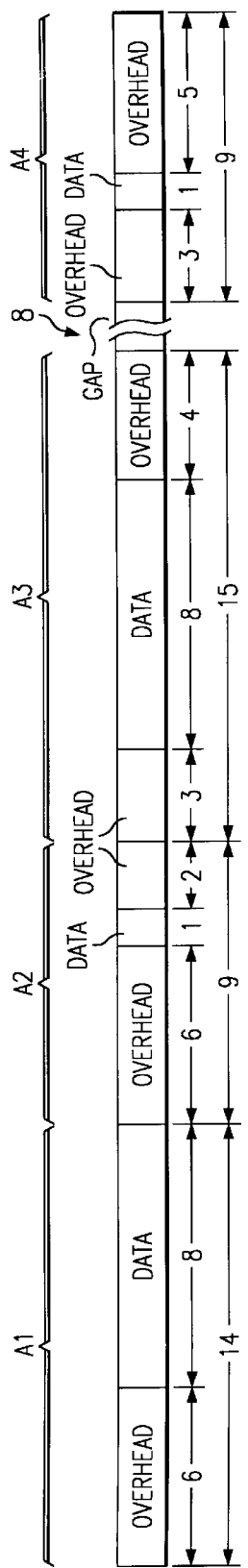
FIG. 1 illustrates a timing diagram of a prior art technique for issuing access signals by a DRAM controller in response to four consecutive memory requests.

To further appreciate the preceding discussion and its benefits, FIG. 6 once again illustrates accesses A1 through A4 from FIG. 1, but now demonstrates the timing of those accesses as modified when implementing method 40 of FIG. 4, and assuming that each access represents a memory access request operable to access a row which is already active in one of the banks in SDRAM 24. Given this assumption, one skilled in the art may readily trace the steps of method 40 to conclude that the leading cycles of overhead of access A2 are positioned to occur at the same time (i.e., overlap) as the final data access cycles of access A1. Thus, the single data unit from access A2 may be read in the clock cycle immediately following the read of the last data unit of the burst of access A1. Similarly with respect to access A3, its leading overhead is advanced to overlap in part the same time as the single read of data from access A2 as well as during part of the time of the ending overhead of access A2. Thus, the actual data access (burst write) begins earlier than it would if the leading overhead for access A3 did not commence until the ending overhead of access A2 were complete. Lastly with respect to access A4, recall that it is received after a gap of 8 cycles. However, since the assumption is that access A4 is directed to a row which is already active, note then that the number of cycles for its leading overhead is reduced (or eliminated) because there is no requirement that this row be precharged and then re-activated between accesses. Thus, the total number of cycles for both the gap and the leading overall is reduced, thereby also reducing access latency. In conclusion, therefore, one skilled in the art will appreciate that the ability to maintain rows active for consecutive SDRAM accesses increases bandwidth without increasing the clock frequency and also reduces power consumption which is often important in portable systems. Thus, overall latency is reduced and system performance is dramatically improved. As a final matter, note that the preceding improvements occur due to the locality and spatiality which arises in many systems, or indeed from certain programs implemented in those systems. In this regard, in the preferred embodiment DRAM controller 18a further includes a programmable bit such that the state of that bit either enables or. disables the functionality of FIG. 4. Thus, if it is determined for whatever reason that such an approach is undesirable (e.g., an assumption surrounding locality or spatiality is in question, or a program is known to cause random or highly unpredictable memory access), then this bit may be set to the appropriate state to disable the FIG. 4 functionality, thereby causing DRAM controller 18a to operate more in the manner of a prior art controller. To the contrary, by setting this bit to enable the above functionality, then the benefits detailed above are achievable for programs where consecutive accesses to the same row in memory are likely to occur.

Figure 6:
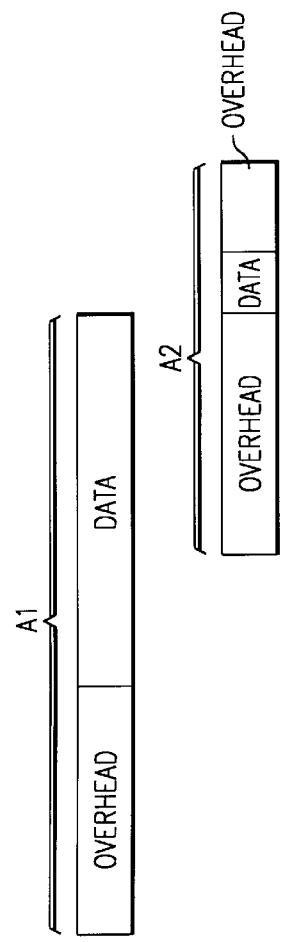
FIG. 6 illustrates a timing diagram of access signals generated in response to four consecutive memory requests and according to the method of the flow chart of FIG. 4.
Figure 6:
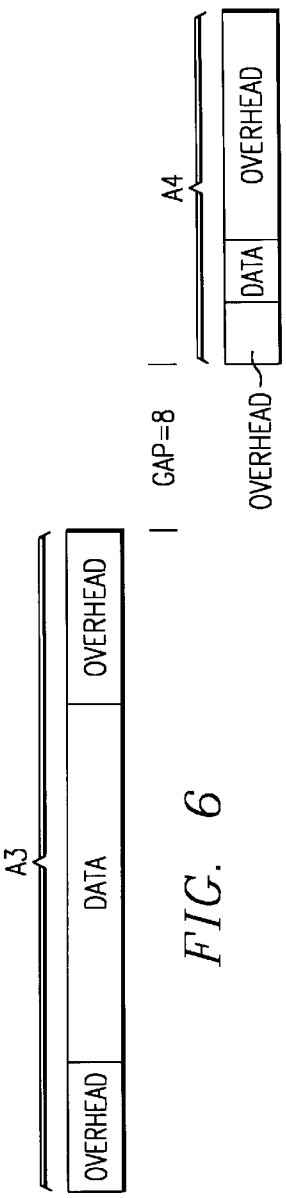
Figure 7:
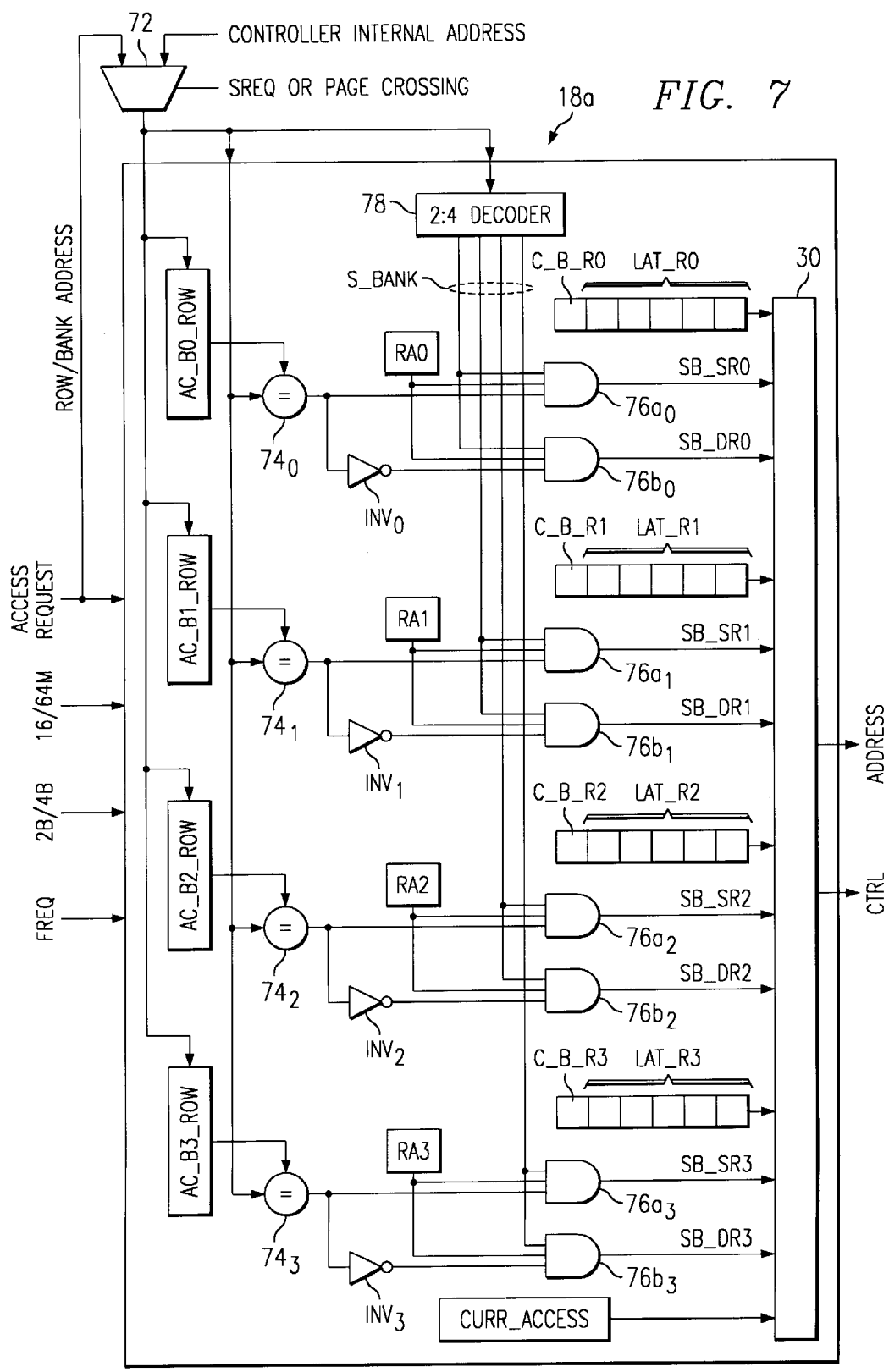
FIG. 7 illustrates a more detailed depiction of DRAM controller 18a shown in FIG. 3 and further explained in the illustrations of FIGS. 4 through 6.

Having discussed DRAM controller 18a via its structure in FIG. 3, its method in FIG. 4, and its results in FIGS. 5 and 6, FIG. 7 now illustrates in greater detail one manner in which various of the details presented above may be implemented. Before proceeding, note therefore that FIG. 7 is by way of concluding the present discussion and various details are not re-stated here that were discussed earlier, with still additional information being ascertainable by one skilled in the art given the teachings of this document. The inputs to FIG. 7, therefore, should be understood from the earlier discussion, and include a signal to indicate the current access request, a control signal for selecting either a 16 Mbit or 64 Mbit memory, a control signal selecting whether the memory being controlled by DRAM controller 18a has either 2 or 4 banks, and a frequency signal which may be used for determining CAS latency. Certain additional connections and details surrounding these signals are discussed below.

From FIG. 7, it may be appreciated that the row and bank address portion of the access request is connected to a first input of a multiplexer 72. The second input of multiplexer 72 is connected to receive an internal address from DRAM controller 18a, where that internal address represents the row and bank address of the most recently accessed row (as readable from any of the AC_Bn_ROW and RAn registers). The control input of multiplexer 72 is connected to the logical OR of either a signal SREQ which is enabled when a successive request signal SREQ is received, or when a page crossing is detected by DRAM controller 18a. Thus, when neither of these events occurs, multiplexer 72 connects the address from the access request to pass to DRAM controller 18a, whereas if either of these events occurs, multiplexer 72 connects the address from the internal request to pass to DRAM controller 18a. The row address output by multiplexer 72 is connected to the inputs of the four AC_Bn_ROW registers so that the address thereafter may be stored in the appropriate one of those four registers for later comparison; in addition, the output of multiplexer 72 is connected to an input on each of four comparators $74_0$ through $74_3$, where the second input of each of those comparators is connected to receive the previously-stored row address from corresponding registers AC_B0_ROW through AC_B3_ROW. Thus, each comparator is able to compare the row address of the current address with the last row address for the corresponding bank (as stored in the register AC_Bn_ROW). The output of comparator $74_0$ is connected to a first input of an AND gate $76a_0$, and to the input of an inverter $INV_0$ which has its output connected to a first input of AND gate $76b_0$. Similarly, the outputs of comparators $74_1$ through $74_3$ are connected to paired AND gates in a comparable manner. The second input of each of AND gates $76a_0$ through $76b_3$ are connected to the output of a 2-to-4 decoder 78, which receives a 2-bit bank address from the address output by multiplexer 72 and which therefore is decoded into an output signal S_BANK for which one of the four outputs of decoder 78 is high based on which of the four banks is being addressed (or of the two banks if a two bank memory is being used). Lastly, the third input of each of AND gates $76a_0$ through $76b_3$ is connected to the output of the corresponding RAn registers.

The outputs of each of AND gates $76a_0$ through $76b_3$ provide inputs to compare logic and state machine 30. More particularly, each AND gate with an "a" in its identifier outputs a high signal if the same bank and same row (hence abbreviated, SB_SR) are being addressed as the most recent (or current) row which was addressed in that bank. Similarly, each AND gate with a "b" in its identifier outputs a high signal if the same bank but different row (hence abbreviated, SB_DR) are being addressed as the most recent (or current) row which was addressed in that bank.

Lastly, as additional inputs to compare logic and state machine 30, note that each pair of AND gates is accompanied by the C_B_Rn register, as well as by a latency signal LAT_Rn introduced here for the first time. As to the latter, note that the state machine of compare logic and state machine 30 preferably includes sufficient states to accommodate the latency requirements which arise due to the various different combinations of commands which may be issued to SDRAM 24 (e.g., ACTV_x, READ, WRITE, etc.). For example, for two consecutive reads, there may be a latency minimum of 9 cycles between accessing the data for these reads. Accordingly, this type of latency as well as other latency requirements between commands correspond to states in compare logic and state machine 30, and those states are encoded for each row in the latency signal LAT_Rn. Thus, compare logic and state machine 30 further considers the latency for each of these rows prior to issuing its next command.

Turning the discussion now to the functionality of traffic controller 18 beyond that of just DRAM controller 18a, this functionality is first introduced by first turning to the hardware block diagram of FIG. 8. FIG. 8 illustrates the blocks of traffic controller 18 as shown in FIG. 2, and further illustrates some additional features. Looking to its features, traffic controller 18 includes FIFO 18b and request stack 18c both introduced above, where recall briefly that FIFO 18b stores burst pixel data for communication to video or LCD controller 20, and request stack 18c stores multiple access requests so that different of these pending requests may be analyzed and acted upon as described below.

Continuing with FIG. 8, in the preferred embodiment, each access request in request stack 18c also has a priority associated with it, and preferably this priority also arrives on a conductor associated with the corresponding request. In a more complex approach, however, the priority may be encoded and stored along with the request in request stack 18c. As detailed below, the priority may be modified thereafter to a value different than the initial value. Thus, in the preferred embodiment where the priority exists as a signal on a conductor, this signal may be changed on that conductor (e.g., changing from one binary state to another may represent a change from a low priority to a high priority). Generally speaking and as more apparent below, a lower priority may cause a delay before the corresponding access request is serviced by issuing a corresponding request to DRAM controller 18a, while conversely a higher priority may cause a corresponding access request to be immediately communicated to DRAM controller 18a even if other efficiency considerations indicate that a current service may increase latency. These alternatives are further explored below.

Traffic controller 18 also includes a priority handler and state machine 18d. Priority handler and state machine 18d may be constructed by one skilled in the art from various alternatives, and in any case to achieve the functionality detailed in this document. As a matter of introduction to the priority analysis, note that priority handler and state machine 18d is shown in FIG. 8 to include a priority table $18d_T$. Priority table $18d_T$ lists the order in which access requests are serviced by issuing corresponding requests to DRAM controller 18a. Priority is based on the type of the circuit which issued the request, and may be based further on a whether for a given circuit its request has been assigned a high priority as opposed to its normal priority, where the dynamic changing of priorities is detailed later. For the sake of discussion, and as shown in FIG. 8, the order of the prioritization by priority handler and state machine 18d is shown here in Table 2:

TABLE 2

| Priority | Type Of Request (with optional assigned priority) |
|---|---|
| 1 | video and LCD controller 20 (high priority) |
| 2 | SDRAM 24 auto refresh (high priority) |
| 3 | peripheral interface 14b (high priority) |
| 4 | SBUS (e.g., host processor 12) |
| 5 | peripheral interface 14b (normal priority) |
| 6 | SDRAM 24 auto refresh (normal priority) |
| 7 | video and LCD controller 20 (normal priority) |
| 8 | flash memory 26 to SDRAM 24 |

By way of example to demonstrate the information of Table 2, if a first pending request is from host processor 112 (i.e., priority 4) and a second request is a high priority request from peripheral interface 14b (i.e., priority 3), then the next request issued by priority handler and state machine 18d to DRAM controller 18a is one corresponding to the high priority request from peripheral interface 14b due to its higher priority value. Other examples should be clear from Table 2 as well as from the following discussion of FIG. 9.

To further demonstrate the illustration of the preceding priority concepts, FIG. 9 illustrates a flow chart of a method designated generally at 80 and which describes the preferred operation of those related components shown in FIG. 8. Method 80 commences with a step 82 where an access request in request stack 18c is analyzed by priority handler and state machine 18d. As appreciated by the conclusion of the discussion of FIG. 9, at any given time the occurrence of step 82 may be such that either a single or multiple requests are pending in request stack 18c. In either event, with respect to an access request in request stack 18c, method 80 continues from step 82 to step 84.

In step 84, priority handler and state machine 18d determines whether there is more than one pending request in request stack 18c. If so, method 80 continues from step 84 to step 86, and if not, method 80 continues from step 84 to step 88. In step 86, priority handler and state machine 18d issues a memory access request to DRAM controller 18a corresponding to the access request in request stack 18c having the highest priority. Table 2 above, therefore, indicates the request which is selected for service in this manner. Also, note that FIG. 9 illustrates in dashed lines a step 86', which is included to demonstrate that priorities may at any time change in any of the various manners described below. In any event, step 86 issues a memory access request to DRAM controller 18a, which in the preferred embodiment should provide access to SDRAM 24 in the manner described earlier. Lastly, recall in the preferred embodiment that in general a single requesting source may have only one pending request at a time; thus, in such an event there will not be two pending requests with the same priority. However, if an embodiment is implemented where multiple requests may be pending from the same source and with the same priority, then it is contemplated for step 86 that step 86 preferably issues a memory request for the access request which has been pending for the longest period of time. Once the request is issued to DRAM controller 18a, method 80 returns from step 86 to step 84 and, thus, the above process repeats until there is only a single pending access request; at that time, method 80 continues to step 88.

In step 88, priority handler and state machine 18d issues a memory access request to DRAM controller 18a corresponding to the single access request in request stack 18c. Thereafter, method 80 returns from step 88 to step 82, in which case the system will either process the next pending access request if there is one in request stack 18c, or await the next such request and then proceed in the manner described above.

As introduced above, the priority associated with certain types of pending requests in request stack 18c may dynamically change from an initial value. Particularly, in the preferred embodiment, priorities associated with access requests from each of the following three sources may be altered: (1) video and LCD controller 20; (2) peripheral interface 14b; and (3) SDRAM 24 auto refresh. To better illustrate the changing of priorities for these three different sources, each is discussed separately below, and the attention of the reader is directed back to FIG. 8 for the following discussion of additional aspects of traffic controller 18.

The priority corresponding to a request from video and LCD controller 20 is assigned based on the status of how much data remains in FIFO 18b (which provides video data to video or LCD controller 20). Specifically, if at a given time FIFO 18b is near empty, then a request issued from video or LCD controller 20 during that time is assigned a relatively high priority; conversely, if FIFO 18b is not near empty at a given time, then a request from video or LCD controller 20 during that time is assigned a normal (i.e., relatively low) priority. To accomplish this indication, FIFO 18b is coupled to provide a control signal to priority handler and state machine 18d. Also in connection with priorities arising from the emptiness of FIFO 18b, if a request is already pending from video and LCD controller 20 and it was initially assigned a normal priority, then that priority is switched to a high priority if FIFO 18b reaches a certain degree of emptiness. The definition of emptiness of FIFO 18b may be selected by one skilled in the art. For example, from Table 2 it should be appreciated that an access request from video and LCD controller 20 is assigned either a priority of 1 (high priority) or a priority of 7 (normal priority). To determine which priority is assigned in the preferred embodiment, a single threshold of storage is chosen for FIFO 18b, and if there is less video data in FIFO 18b than this threshold, then any issued or pending request from video and LCD controller 20 is assigned a high priority, whereas if the amount of data in FIFO 18b is equal to or greater than this threshold, then any issued or pending request from video and LCD controller 20 is assigned a normal priority. Note further, however, that one skilled in the art could choose different manners of selecting priority, and need not limit the priority to only two categories. For example, as an alternative approach, a linear scale of one to some larger number may be used, such as a scale of one to five. In this case, if FIFO 18b is $\frac{1}{5}^{th}$ or less full, then a priority value of one is assigned to an access request from video or LCD controller 20. As another example, if FIFO 18b is $\frac{4}{5}^{th}$ or more full, then a priority value of five is assigned to an access request from video or LCD controller 20.

The priority corresponding to an access request from peripheral interface 14b is initially assigned a normal value, but then may be changed dynamically to a higher value based on how long the request has been pending. In this regard, traffic controller 18 includes a timer circuit 18e which includes a programmable register $18e_R$ for storing an eight bit count threshold. Thus, when an access request from peripheral interface 14b is first stored in request stack 18c, then it is assigned a normal priority, and from Table 2 it is appreciated that this normal priority in relation to the other priorities is a value of 5. However, at the time of the store of this request, timer circuit 18e begins to count. If the count of timer circuit 18e reaches the value stored in programmable register 18c before the pending request is serviced, then timer circuit 18e issues a control signal to priority handler and state machine 18d to change the priority of the access request from normal to high. Once more referring to Table 2, it is appreciated that this high priority in relation to the other priorities is a value of 3. Note also that if the request is serviced before timer circuit 18e reaches its programmed limit, then the count is reset to analyze the next pending peripheral request. Additionally, while the preceding discussion refers only to a single peripheral request, an alternative embodiment may maintain separate counts if more than one peripheral request is pending in request stack 18c, where each separate count starts when its corresponding request is stored.

The priority corresponding to an auto refresh request is initially assigned a normal value, but then may be changed dynamically to a higher value based on how long the request has been pending. Before detailing this procedure, note first by way of background for SDRAM memory that it is known that a full bank must be refreshed within a refresh interval. Usually for most SDRAMs currently on the market, this time is standard and equal to 64 msec. During this 64 msec, all the banks must be refreshed, meaning that a given number of required auto refresh requests (e.g., 4 k) must be sent to the SDRAM. As also known in the art, an auto refresh request does not include an address, but instead causes the SDRAM to increment a pointer to an area in the memory which will be refreshed in response to receiving the request. Typically, this area is multiple rows, and for a multiple bank memory causes the same rows in each of the multiple banks to be refreshed in response to a single auto refresh request. Lastly by way of background for auto refresh, in the prior art there are. generally two approaches to issuing the auto refresh requests to an SDRAM, where a first approach issues the auto refresh requests at evenly spaced time intervals during the refresh period and where a second approach issues a single command causing all lines of all banks to be refreshed in sequence in response to that command. In the present inventive embodiment, however, it is noted that each of these prior art approaches provides drawbacks. For example, if the auto refresh requests are evenly spaced, then each time one of the requests is received and acted upon by SDRAM 24 then that would cause all banks of the memory to be precharged. Such a result, however, would reduce the benefits of maintaining rows active for considerable periods of time as is achieved by the present invention. As another example, if a single command is issued to cause all rows of all banks to be refreshed, then during that period of refresh the memory is unavailable to any source, which may be particularly detrimental in a complex system. Thus, the preferred embodiment overcomes these disadvantages as explained immediately below.

In the preferred embodiment, auto refresh is achieved by priority handler and state machine 18d sending bursts of auto refresh requests to DRAM controller 18a. Generally and as shown below, the bursts are relatively small, such as bursts of 4, 8, or 16 auto refresh requests. Thus, in response to these requests there are periods of time where SDRAM 24 is precharged due to the auto refresh operation, but this period is far shorter than if 4096 requests were consecutively issued to cause precharging to occur in response to all of those requests within a single time frame. In addition, between the time of these bursts, other requests (of higher priorities) may be serviced by priority handler and state machine 18d. Indeed, many of these other requests may be directed to already-active rows and therefore during this time those rows are not disturbed (i.e., precharged) due to a refresh operation. Turning now to the details of the implementation of these operations, traffic controller 18 includes a timer circuit 18f which includes a programmable register 18f for storing an auto refresh request burst size (e.g., 4, 8, or 16). In response to a reset of timer circuit 18f, a number of burst requests, with the number indicated in programmable register $18f_R$, are added to request stack 18c and at a normal priority (e.g., 6 in Table 2). At this point, timer circuit 18f begins to advance toward a time out value (e.g., 256 microseconds), while the burst of auto refresh requests are pending. As detailed above in connection with FIG. 9, priority handler and state machine 18d proceeds by issuing requests to DRAM controller 18a according to the relative priority of any pending requests in stack 18c. Thus, if priority level 6 requests are reached, these pending auto refresh requests are issued to DRAM controller 18a. Accordingly, as timer circuit 18c advances toward its time out value, one of two events will first happen. One event is that all of the pending auto refresh requests may be issued to DRAM controller 18a, and the other event is that timer circuit 18f will reach its time out value. If all of the pending auto refresh requests are issued to DRAM controller 18a, then timer circuit 18f is reset to zero and another burst of auto refresh requests are added to request stack 18c. On the other hand, if timer circuit 18f reaches its time out value while one or more of the auto refresh requests of the previous burst are pending, then priority handler and state machine 18d dynamically increases the normal priority of the pending auto refresh request(s) to a high priority (e.g., 2 in Table 2). In addition, once again timer circuit 18f is reset to zero and another burst of normal priority auto refresh requests are added to request stack 18c. However, as method 80 continues to process pending requests, the chance of service for those auto refresh requests which had their priority increased is considerably increased given the considerable change in priority (e.g., from 6 to 2).

Given the preceding, one skilled in the art will appreciate numerous benefits of the auto refresh methodology in the preferred embodiment. For example, the bursts of auto refresh requests generally avoids precharging the banks too often. In contrast, if it were chosen to spray the auto refresh command evenly across the maximum refresh interval, an auto refresh command would be sent to SDRAM 24 every 15.62 microseconds (i.e., 64 ms/4096 lines=15.62 microseconds). Thus, all banks would have to be precharged every 15.62 microseconds. In contrast and looking to the preferred embodiment which groups the auto refresh commands in bursts, the priority capability permits the burst of auto refresh requests to stay pending and in many instances to be serviced during the gap left between requests with higher priority. This increases the time between two global precharges. For example, if 16 auto refresh requests are grouped, the gap between two global precharge (DCAB command) can be 250 microseconds. This shows clearly the benefit of associating this auto refresh burst mechanism with DRAM controller 18a. This burst of auto refresh can of course be interrupted by any request with a higher priority.

Concluding the present discussion of priorities, note from Table 2 that there are two types of access requests that have a priority which is not altered. A first of these access requests is an access request received from the SBUS, and most notably that includes an access request from host processor 12. In this regard, note further therefore that under normal operations, that is, when no other request has been altered to have a high priority, then host processor 12 will have the highest priority. Thus, it is anticipated that usually there will be sufficient gaps between the time that host processor 12 requires access to memory and during these gaps the access requests from other sources may be serviced given their normal priority. However, to the extent that these gaps are not sufficient, the priority scheme of the preferred embodiment further serves to raise the priority of these other access requests so that they are also serviced without causing locking problems to the system. As a final matter relating to priorities of the preferred embodiment as shown in Table 2, note that an access request for a transfer from flash memory 26 to SDRAM 24 is always given the lowest priority (priority 8).

To present another inventive aspect preferably included within traffic controller 18, FIG. illustrates a method 90 also performed by priority handler and state machine 18d, and directed to burst requests. At the outset, it also should be noted that method 90 occurs in parallel with method 80 described in connection with FIG. 9. Method 90 begins with a step 92 where an access request stored in request stack 18c is selected for analysis by priority handler and state machine 18d. Next, in step 94, priority handler and state machine 18d determines whether the pending access request is a burst request and, if so, whether the size S of the request in bytes is greater than a predetermined base size B of bytes. By way of example, assume that B equals eight. If S is greater than B, then method 90 continues to step 96, whereas if S is equal to or less than B, then method 90 returns to step 92 and thereby proceeds to analyze the next pending access request.

In step 96, priority handler and state machine 18d effectively splits up the burst request from step 94 into multiple burst requests. The benefits of this operation are described later, but first is presented a discussion of the preferred embodiment technique for the request split. Preferably, this operation is achieved by replacing the burst request from step 94 with S/B burst requests, where each replacement burst request is for a burst of B bytes. For example, assume that step 94 is performed for a burst request size having a size S equal to 32 bytes. In that case, S exceeds B (i.e., 32>8) and the method continues to step 96. In step 96 under this example, priority handler and state machine 18d replaces the 32 byte access request with four access burst requests (i.e., S/B=32/8=4), where each new request is for a burst of 8 bytes (i.e., B=8).

In a preferred embodiment where traffic controller 18 includes DRAM controller 18a described above, note further that the split requests are designated in a manner so that they may be recognized by DRAM controller 18a as relating to successive burst requests, and thereby permit further efficiency in relation to address transmission. Specifically, when a burst request is split into multiple requests, then the first request is designated as a request REQ to DRAM controller 18a, and is encoded as shown later in Table 5. In general, for each of the remaining multiple requests, each is designated as a sequential request SREQ to DRAM controller 18a. Thus, for the example where a burst request from a source S1 is split into four requests, then the requests issued by traffic controller 18 to its DRAM controller 18a are: (1) REQ[s1]; (2) SREQ[s1]; (3) SREQ[s1]; (4) SREQ[s1]. Turning now to the benefit of this distinction, recall generally that DRAM controller 18a operates in some instances to maintain rows active in SDRAM 24 for consecutive accesses. In the current context, note then that when DRAM controller 18a receives an SREQ request, it is known by that designation that the request is directed to a data group which follows in sequence an immediately preceding request. Two benefits therefore arise from this aspect. First, in the preferred embodiment, an additional address is not transmitted by traffic controller 18 to DRAM controller 18a for an SREQ request, thereby reducing overhead. Second, using an increment of the currently accessed address, DRAM controller 18a is able to determine whether the data sought by the SREQ request is on the same row as is currently active and, if so, to cause access of that data without precharging the row between the time of the previous access and the time of the access corresponding to the SREQ access. However, note lastly that in the preferred embodiment DRAM controller 18a also may determine from the currently accessed address, as well as the number of successive SREQ accesses and the burst size, whether a page crossing has occurred; if a page crossing has occurred; then DRAM controller 18a causes the currently accessed row to be precharged and then activates the next row corresponding to the SREQ request.

Also in the preferred embodiment and given the priority capability of priority handler and state machine 18d, note further that multiple requests resulting from a split burst request may be treated differently in the respect of the REQ and SREQ designations if a higher priority request from a source is received by traffic controller 18 while the split requests are still pending. Particularly, in such a case, the REQ designation is given again to the first of the multiple requests, but also to the first request following an inserted higher priority request. For example, assume again that a first burst request from a source s1 is split into four requests, but assume also that a higher priority request is received after the second of the four split requests is sent to DRAM controller 18a. In this case, the sequence of requests to DRAM controller 18a are: (1) REQ[s1]; (2) SREQ[s1]; (3) REQ[s2]; (4) REQ[s1]; (5) SREQ[s1]. Thus, it may be appreciated that request (2) is a successive request to the same row address as request (1), and request (5) is a successive request to the same row address as request (4); however, between requests (2) and (4) is inserted the higher priority request (3). Once again, therefore, each SREQ is treated in the manner described earlier and, thus, does not require the transmission of an address to DRAM controller 18a and may well result in a same row being accessed as the request(s) preceding it.

Concluding method 90, after step 96 it returns to step 92 to analyze the next pending access request. Lastly in connection with step 96, note that the preceding example assumes that B divides evenly into S. However, in the instance that this is not the case, then step 96 preferably replaces the single access request with an integer number of burst requests equal to the integer portion of S/B plus one, where each of the S/B requests is for a burst of B bytes, and the additional request is for the remainder number of bytes. For example, for a pending DMA burst request with S equal to 35, then step 96 replaces that request with four access requests seeking a burst of 8 bytes each, and a fifth access request with a burst of 3 bytes.

Having presented method 90, note that it provides unique benefits when combined with the ability to maintain rows active as was discussed in connection with DRAM controller 18*a*, above, and further in combination of the priority aspects described in connection with FIGS. 7 and 8. To appreciate this, recall in the Background Of The Invention section of this document it was noted how burst size may affect efficiencies. Specifically, it was noted that one prior art approach has been to increase burst sizes to avoid overhead penalty, but this approach also causes problems when a lengthy burst prevents other circuits from memory access during the burst. In contrast, note that method 90 permits a lengthy burst request to be broken down into numerous smaller bursts. However, if there is no higher pending priority request, then under the present inventive teachings these smaller bursts are continuously issued by the DMA controller to the DRAM controller. Additionally, since the bursts are accessing contiguous memory locations, then it is likely that each successive small burst will access a row in SDRAM 24 that is being maintained as active, so there is no overhead between successive accesses corresponding to each successive burst. Additionally, at any point that a higher priority request is received by the DMA controller, then the present invention effectively provides an efficient interruption of what was a lengthy burst. Specifically, since the lengthy burst has been broken down into multiple smaller bursts, then a higher priority request may be inserted to occur between occurrences of two of the small bursts, and once that higher priority request is serviced, the successive small burst may once again be serviced until all of the small bursts are complete. Thus, in this manner, the high priority request is, in effect, inserted in the middle of what originally was a lengthy burst request, and it is likely that the burst is able to re-start with minimal overhead. In conclusion, therefore, the present inventive aspects combine in many instances to permit an effective larger burst, yet in other instances to allow higher priority requests to be serviced without having to wait for completion of a lengthy burst.

Having detailed various general and specific functions of traffic controller 18 with respect to SDRAM 24, this document now concludes with the following presentation of various ports and signals to illustrate to one skilled in the art one manner in which various of the preceding operations may be achieved. In this regard, Table 3 immediately below lists the general interface ports from traffic controller 18 to SDRAM 24:

TABLE 3

| PIN name | Type (I = input, O = output, or I/O = input/output) | Description |
| --- | --- | --- |
| SDRAM_DATA[15:0] | I/O | 16 bit data bus |
| SDRAM_ADDR[13:0] | O | 14 bit multiplexed address bus |
| SDRAM_CLK | O | system clock |
| CKE | O | clock enable for power |

TABLE 3-continued

| PIN name | Type (I = input, O = output, or I/O = input/output) | Description |
| --- | --- | --- |
| | | down and self refresh |
| /RAS | O | row address strobe |
| /CAS | O | column address strobe |
| /WE | O | write enable |
| DQML,DQMU | O | data byte mask |
| CS | I | chip select |
| CLK | I | SDRAM clock |

Additionally, the following signals of Table 4 illustrate the manner of the preferred embodiment for traffic controller 18 to present access requests to SDRAM 24 in response to access requests posed to traffic controller 18 from the various circuits which may request DMA access or direct access (e.g., host processor 12, DSP 14*a*, a peripheral through peripheral interface 14*b*, and video or LCD controller 20), with the immediately following Table 5 illustrating the states of those signal to accomplish different access types.

TABLE 4

| Signal | Description |
| --- | --- |
| DMA_Req[3:0] | A one bit per request to specify which type of transfer is requested on the bus.to/from SDRAM 24. |
| DMA_Req_Dir | Low for a write to SDRAM 24; high for a read from SDRAM 24. |
| DMA_Burst_Req_size | Indicates size of the burst in order to interrupt the burst after the exact number of specified accesses. |

TABLE 5

| DMA_Req [3:0]* | DMA_Req_Dir | DMA_ADDR | Access Type |
| --- | --- | --- | --- |
| 0000 | | x | no access |
| 0001 (REQ) | 0 | DMA_Addr[22:0] | burst write (1–8 accesses) |
| 0001 (REQ) | 1 | DMA_Addr[22:0] | burst read (1–8 accesses) |
| 0010 (SREQ) | 0 | x | sequential burst write (1–8 accesses) |
| 0010 (SREQ) | 1 | x | sequential burst read (1–8 accesses) |
| 0100 | x | x | auto refresh |
| 1000 | 0 | SET_MODE_SDRAM | MRS request** |
| 1000 | 1 | SET_MODE_SDRAM | MRS request*** |

*Accesses are generated by traffic controller 18. Two requests by traffic controller 18 are not generated simultaneously and, thus, only one bit is active at the same time which avoids having to decode the request. Before traffic controller 18 sends a successive request, it must first receive a /SDRAM_Req_grant signal. The grant indicates that the request has been taken into account and is currently processed.
**The DMA data bus is put on the SDRAM address bus when the MRS command is executed to program the SDRAM internal control register.
***When the SET_MODE_SDRAM is read the local registers from the SDRAM controller module (not the SDRAM internal register) are read.

Lastly, Table 6 below illustrates still additional control signals along control bus 24*c* between traffic controller 18 and SDRAM 24.

TABLE 6

| Signal | Description |
| --- | --- |
| SDRAM_Req_Grant | Active high and indicates that the access request to SDRAM 24 has been granted. The address, burst size, byte/word, and direction are stored locally and a new request can then be piped in by traffic controller 18. |
| SDRAM_Save_Addr | Indicates when the traffic controller 18 should save the address to update the DMA pointer for the next burst. |
| DMA_Single_Access_Size | Use for single accesses and combined with DMA_ADDR[0] to generate appropriate control signals for selecting only a single byte of a word. |
| DMA_Addr_in[22:0] | A 23 bit address corresponding to the beginning of the burst. DMA_ADDR[0] is 0 on burst accesses. |
| SDRAM_Data_Ready_Write_Done | Active high signal received by traffic controller 18 to indicated that the data operation is in process and executed on the next rising edge. |

From the above, it may be appreciated that the above embodiments reduce memory access latency, and may be implemented in a DRAM controller, in a DMA system, or in both, and in any event provide various improvements over the prior art. In addition to the above teachings, it should also be note that while the present embodiments have been described in detail, various substitutions, modifications or alterations could be made to the descriptions set forth above without departing from the inventive scope. For example, different control signals may be used to achieve the functionality described, particularly if a different type of memory is involved in the DRAM control. As another example, while FIGS. 4, 8, and 9 illustrate generally sequential methods via flow charts, it should be understood that the preferred embodiment implements state machines to perform these steps and, thus, flow may be to alternative states from each state rather than sequential as shown in the flow diagram. As yet another example, while various priority considerations have been discussed, still others may be implemented to reduce latency such as re-arranging the order of priority for some of the above sources or such as excluding some of the sources or including still others into the priority scheme (e.g., DSP 14a). As yet a another example, wireless data platform 10 is a general block diagram. Thus, additional features may be included, and modifications may be made, although such are not shown to simplify the illustration and focus the later discussion to DRAM and DMA control aspects. As a brief note of features not shown but contemplated, platform 10 may include an I/O controller and additional memory such as RAM/ROM. Still further, a plurality of devices could be coupled to wireless data platform 10 either via an I/O controller or as peripherals via peripheral interface 14b. Such devices may include a smartcard, keyboard, mouse, or one or more serial ports such as a universal serial bus ("USB") port or an RS232 serial port. As examples of particular modifications to platform 10, the separate caches of processor 12 and DSP 14a could be combined into a unified cache. Further, a hardware acceleration circuit is an optional item to speed the execution of languages such as JAVA; however, the circuit is not necessary for operation of the device. Lastly, although the illustrated embodiment shows a single DSP, multiple DSPs (or other coprocessors) could be coupled to the buses. As a final example, platform 10 is only by way of illustration, and it should be understood that numerous of the inventive aspects may be implemented in other systems having either or both of DRAM control and DMA control. Thus, the previous description, these examples, and other matters ascertainable by one skilled in the art given the present teachings should help illustrate the inventive scope, as defined by the following claims.

What is claimed:

1. A memory traffic access controller responsive to a plurality of requests to access a memory for video data, comprising:

circuitry for associating, for each of the plurality of requests, an initial priority value corresponding to the request;

circuitry for changing the initial priority value for selected ones of the plurality of requests to a different priority value responsive to an indicator from a storage circuit for storing video data wherein the indicator represents a level of emptiness of the storage circuit; and circuitry for outputting a signal to cause access of the memory in response to a request in the plurality of requests having a highest priority value.

2. The memory traffic access controller of claim 1:

wherein the storage circuit comprises a first-in-first-out storage circuit; and wherein the indicator represents that an amount of video data in the first-in-first-out storage circuit is beyond a storage threshold of the first-in-first-out storage circuit.

3. A memory traffic access controller responsive to a plurality of requests to access a memory, comprising:

circuitry for associating, for each of the plurality of requests, an initial priority value corresponding to the request;

circuitry for changing the initial priority value, being responsive to an amount of time that the request to access the memory to perform a refresh of the memory is pending, for selected ones of the plurality of requests to a different priority value;

circuitry for outputting a signal to cause access of the memory, to perform a refresh of the memory, in response to a request in the plurality of requests having a highest priority value;

circuitry for periodically issuing a burst of requests to access the memory to perform a refresh of the memory, wherein the burst of requests includes the request to access the memory to perform a refresh of the memory; and wherein the circuitry for changing the initial priority value to a different priority value changes the initial priority of any of the burst of requests to access the memory to perform a refresh of the memory which are pending after expiration of a predetermined time period.

4. The memory traffic access controller of claim 3, and further comprising a programmable storage device for indicating a number of requests to be included in the burst of requests to access the memory to perform a refresh of the memory.

5. A memory traffic access controller responsive to a plurality of requests to access a memory for video data, comprising:

circuitry for associating, for each of the plurality of requests, an initial priority value corresponding to the request;

circuitry for changing the initial priority value for selected ones of the plurality of requests to a different priority value responsive to an indicator from a storage circuit for storing video data, wherein the indicator represents a level of emptiness of the storage circuit and to an amount of time that a request to access the memory by a peripheral circuit is pending and to an amount of time that a request to access the memory to perform a refresh of the memory is pending; and circuitry for outing a signal to cause access of the memory in response to a request in the plurality of requests having a highest priority value.

6. The memory traffic access controller of claim 5 wherein the circuitry for selectively changing the initial priority value to a different priority value does not change the initial priority value if the request to access the memory is by a host processor.

7. A memory traffic access controller responsive to a plurality of requests to access a memory, comprising:

circuitry for associating, for each of the plurality of requests, an initial priority value corresponding to the request;

circuitry for changing the initial priority value for selected ones of the plurality of requests to a different priority value;

circuitry for outputting a signal to cause access of the memory in response to a request in the plurality of requests having a highest priority value;

circuitry for detecting that a received request to access the memory is a burst access request;

conversion circuitry for converting the burst access request into an integer number N of burst access requests, where N equals S divided by B if B divides equally into S.

8. The memory traffic access controller of claim 7 wherein the integer B equals eight bytes.

9. A memory traffic access controller responsive to a plurality of requests to access a memory, comprising:

circuitry for associating, for each of the plurality of requests, an initial priority value corresponding to the request;

circuitry for changing the initial priority value for selected ones of the plurality of requests to a different priority value;

circuitry for outputting a signal to cause access of the memory in response to a request in the plurality of requests having a highest priority value;

circuitry for detecting that a received request to access the memory is a burst access request;

conversion circuitry for converting the burst access request into an integer number N of burst access requests, where N equals (S divided by B) plus one if B divides unequally into S.

10. The memory traffic access controller of claim 9 wherein the integer B equals eight bytes.

11. A method of operating a memory traffic access controller responsive to a plurality of requests to access a memory for video data, comprising the steps of:

associating, for each of the plurality of requests, an initial priority value corresponding to the request;

changing the initial priority value for selected ones of the plurality of requests to a different priority value responsive to an indicator from a storage circuit for storing video data, wherein the indicator represents a level of emptiness of the storage circuit; and outputting a signal to cause access of the memory in response to a request in the plurality of requests having a highest priority value.

12. The method of claim 11:

wherein the storage circuit comprises a first-in-first-out storage circuit; and wherein the indicator represents that an amount of video data in the first-in-first-out storage circuit is beyond a storage threshold of the first-in-first-out storage circuit.

13. A method of operating a memory traffic access controller responsive to a plurality of requests to access a memory, comprising the steps of:

associating, for each of the plurality of requests, an initial priority value corresponding to the request;

changing the initial priority value, in response to an amount of time that the request to access the memory to perform a refresh of the memory is pending, for selected ones of the plurality of requests to a different priority value;

outputting a signal to cause access of the memo to perform a refresh of the memory in response to a request in the plurality of requests having a highest priority value;

periodically issuing a burst of requests to access the memory to perform a refresh of the memory, wherein the burst of requests includes the request to access the memory to perform a refresh of the memory; and wherein the step of changing the initial priority value to a different priority value changes the initial priority of any of the burst of requests to access the memory to perform a refresh of the memory which are pending after expiration of a predetermined time period.

* * * * *